United States Patent

Kajino et al.

[11] Patent Number: 5,821,662
[45] Date of Patent: Oct. 13, 1998

[54] STARTER WITH BRUSH COOLING STRUCTURE

[75] Inventors: Sadayoshi Kajino, Nagoya; Kazuhiro Yamaguchi, Okazaki; Masami Niimi, Handa; Masanori Ohmi, Anjo, all of Japan

[73] Assignee: Nippondenso Co., Ltd., Kariya, Japan

[21] Appl. No.: 694,451

[22] Filed: Aug. 12, 1996

[30] Foreign Application Priority Data

Sep. 4, 1995 [JP] Japan .................................. 7-226670
Jun. 7, 1996 [JP] Japan .................................. 8-145855

[51] Int. Cl.⁶ .......................... H02K 13/00; H02K 9/02; F02N 15/06
[52] U.S. Cl. ........................... 310/239; 310/64; 74/7 R
[58] Field of Search ........................ 74/7 R, 7 A, 7 E; 310/64, 65, 89, 239

[56] References Cited

U.S. PATENT DOCUMENTS

| | | | |
|---|---|---|---|
| 4,366,403 | 12/1982 | Simpson et al. | 310/239 |
| 4,673,838 | 6/1987 | Takagi et al. | 310/239 |
| 4,712,030 | 12/1987 | Lakin et al. | 310/89 |
| 4,754,184 | 6/1988 | Morikane et al. | 310/239 |
| 4,868,442 | 9/1989 | Isozumi et al. | 310/239 |
| 4,881,416 | 11/1989 | Isozumi | 74/7 A |
| 4,897,571 | 1/1990 | Isozumi | 310/239 |
| 4,922,149 | 5/1990 | Isozumi et al. | 310/89 |
| 4,962,340 | 10/1990 | Isozumi | 290/48 |
| 5,055,728 | 10/1991 | Looper et al. | 310/91 |
| 5,289,070 | 2/1994 | Shiroyama et al. | 310/239 |
| 5,443,553 | 8/1995 | Shiga et al. | 74/7 R |
| 5,473,208 | 12/1995 | Stihi | 310/68 D |

*Primary Examiner*—Steven L. Stephan
*Assistant Examiner*—Michael J. Wallace, Jr.
*Attorney, Agent, or Firm*—Cushman, Darby & Cushman, IP Group of Pillsbury, Madison & Sutro LLP

[57] ABSTRACT

A brush holder is held between a yoke of a starter motor and an end frame made of resin. The brush holder has an engaging guide portion projecting axially therefrom and engaging the yoke and the end frame and a projected peripheral portion projecting outside from peripheral surfaces of the yoke and that of the end frame. The brush holder contacts the yoke and the end frame at cylindrical surfaces thereof and surfaces perpendicular to the cylindrical surfaces. This construction allows the brush holder to be prevented from loosening, thus improving the vibration proof and durability of the brush holder. Further, the brush holder contacts the yoke and the end frame at the cylindrical surfaces thereof and the surfaces perpendicular to the cylindrical surfaces, thus dissipating the heat of a brush through the brush holder and the yoke more efficiently.

9 Claims, 15 Drawing Sheets

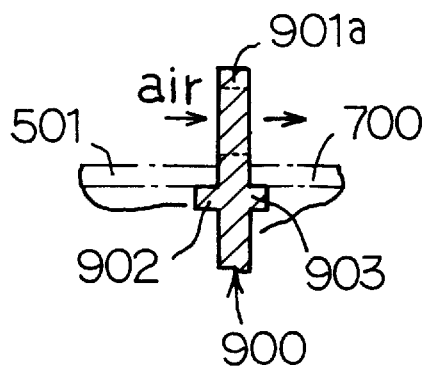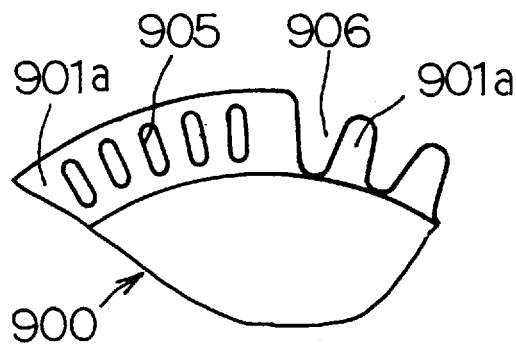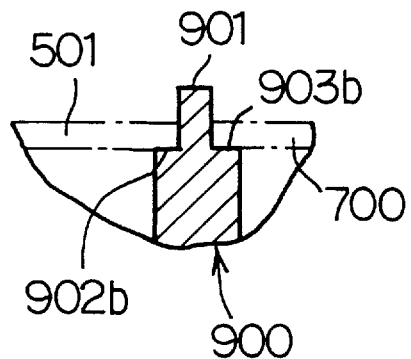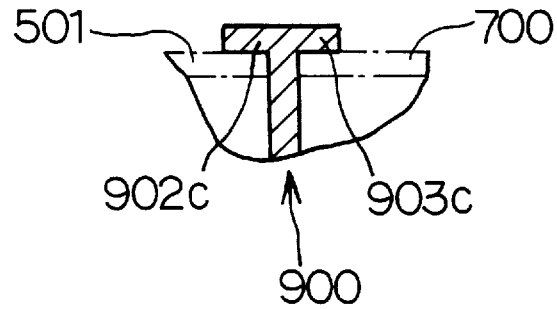

STARTER WITH BRUSH COOLING STRUCTURE

BACKGROUND OF THE INVENTION

1. Field of the Invention

The present invention relates to a starter provided with a speed reduction mechanism and more particularly to a starter capable of cooling a brush.

2. Description of Related Art

A conventional starter motor of brush holder sandwiching type to start an internal combustion engine of a car is disclosed in Journal of Nippondenso Technical Disclosure No. 55-142. This starter motor comprises a cylindrical yoke formed of a soft magnetic metal and surrounding an armature; a cup-shaped rear end frame formed of metal and shielding an opening of the yoke positioned at the brush-provided side; and a brush holder which holds the brush slidably and the periphery of which is axially held between the yoke and the rear end frame.

In the brush holder-sandwiching construction, the circular brush holder is held between the yoke and the end frame, with the yoke fitted in (so-called spigot joint) the brush holder. More specifically, the brush holder is held between the yoke and the end frame by sandwiching both main surfaces of the brush holder between a stepped surface of the yoke formed thereon in the radial direction thereof and an end surface of the brush holder.

In the starter motor of the above-described brush holder-sandwiching type, it is necessary for the brush holder to dissipate heat generated by the resistance loss of the brush and frictional heat generated by the sliding contact between the brush and a commutator. Thus, the construction of the starter motor has a disadvantage that the sliding-contact surface of the brush and that of the commutator may be overheated.

SUMMARY OF THE INVENTION

The present invention has been developed in view of the above-described problems, and it is an object of the present invention to provide a starter motor in which a heat generating portion between a brush and a commutator can be reliably cooled.

According to the present invention, a brush holder is arranged substantially in parallel with a surface type commutator and in proximate thereto and has a projected peripheral portion. The brush holder is in contact with a yoke, with heat generated between the brush and the commutator being transmitted to the brush holder. Even though an armature of a starter equipped with a speed reduction mechanism is rotated at a high speed, the brush holder dissipates the heat of the brush therethrough and the yoke more efficiently than the conventional one and allows the electrical contact resistance to be lower. Further, the starter can be allowed to have an improved output.

Further, a projected peripheral portion of the brush holder projects outside from the starter, both main surfaces of the brush holder is capable of contacting the entire end surface of the yoke and that of the rear end frame. Therefore, the brush holder can be held reliably by the yoke and the end frame and further, the heat transfer resistance can be held at a low value. Moreover, the projected peripheral portion is cooled by outside air so that the brush holder provides an improved cooling performance.

Preferably, the projected peripheral portion of the brush holder is positioned outside from the peripheral surface of the yoke and that of the end frame in the radial direction thereof. Thus, the brush holder contacts outside air in a wide area, thereby cooling the brush which becomes hot due to the sliding-contact friction between the brush and upper layer coil ends.

Preferably, the projected peripheral portion of the brush holder has grooves or through holes formed thereon allowing air to pass therethrough in the axial direction of the brush holder. This construction increases an area to be cooled, and improves the cooling performance of the brush holder owing to air flows generated in the axial direction of the brush holder generated by a cooling fan fixed to the rotation shaft of the armature, by the travel of a car, and by an engine-cooling fan.

Preferably, the surface type commutator generates a centrifugal air flow which cools the commutator and the brush efficiently.

Preferably, the brush holder has a bearing cylindrical portion which supports the rotation shaft of the armature through a bearing. Therefore, it is not necessary for the end frame to support the rotation shaft, and hence the end frame can be allowed to have a simple construction and be light. The brush holder is thick and rigid enough to hold the brush firmly against the vibration of an engine and transfer the heat of the brush efficiently, so that the brush holder is capable of holding the rotation shaft reliably. That is, the brush holder is rigid enough to hold both the brush and the rotation shaft reliably without vibrating them.

Preferably, the brush holder is held between the yoke and the end frame, and the yoke and the end frame are not directly connected with each other. Thus, there is a possibility that the end frame and the yoke are dislocated relative to each other. In case the brush holder has the bearing cylindrical portion which supports the armature through the bearing, the rotation shaft is supported by the brush holder engaging the yoke directly.

Preferably, the engaging guide of the brush holder has a guide surface which guides the inner peripheral surface of the yoke and that of the end frame in assembling the starter.

Preferably, the projected peripheral surface of the brush holder serves as an engaging guide for guiding the peripheral surface of the yoke and that of the end frame in assembling the starter. This construction allows the engaging guide to have an improved performance in dissipating heat to the yoke and to the outside.

Preferably, the brush holder has a positioning portion which engages a positioning portion formed on each of the yoke and the end frame at a predetermined position in the circumferential direction thereof, thus determining the position of the brush holder in the circumferential direction thereof. This construction permits the brush holder to be placed in position relative to the yoke and the end frame in the circumferential direction thereof.

Preferably, the brush holder has a through hole through which a through bolt for fastening the end frame and the yoke to each other is inserted. In this construction, the through hole formed on the brush holder serves as a positioning portion in the circumferential direction thereof. Even if the through bolt loosens due to the vibration of the engine and the difference in the coefficient of thermal expansion of the end frame made of resin, that of the brush holder made of metal, and that of the yoke made of metal, this construction prevents the brush holder from being dislocated from the yoke or the end frame radially or circumferentially.

Preferably, the brush holder is made of cast metal or bent metal blank-out panel. This method of forming the brush holder can be carried out easily.

BRIEF DESCRIPTION OF THE DRAWINGS

The present invention will become more readily apparent from the following detailed description of the preferred embodiments of the present invention taken in conjunction with the accompanying drawings, in which:

FIG. 18A is a side view partly in section showing a modification of a brush holder of the starter of the first embodiment, and FIG. 18B is a partial front view showing slots and grooves formed on the brush holder in an axial direction thereof;

FIG. 19 is a side view partly in section showing a modification of a brush holder of the starter of the first embodiment;

FIG. 20 is a side view partly in section showing a modification of a brush holder of the starter of the first embodiment;

DETAILED DESCRIPTION OF PRESENTLY PREFERRED EMBODIMENTS

Figure 1:
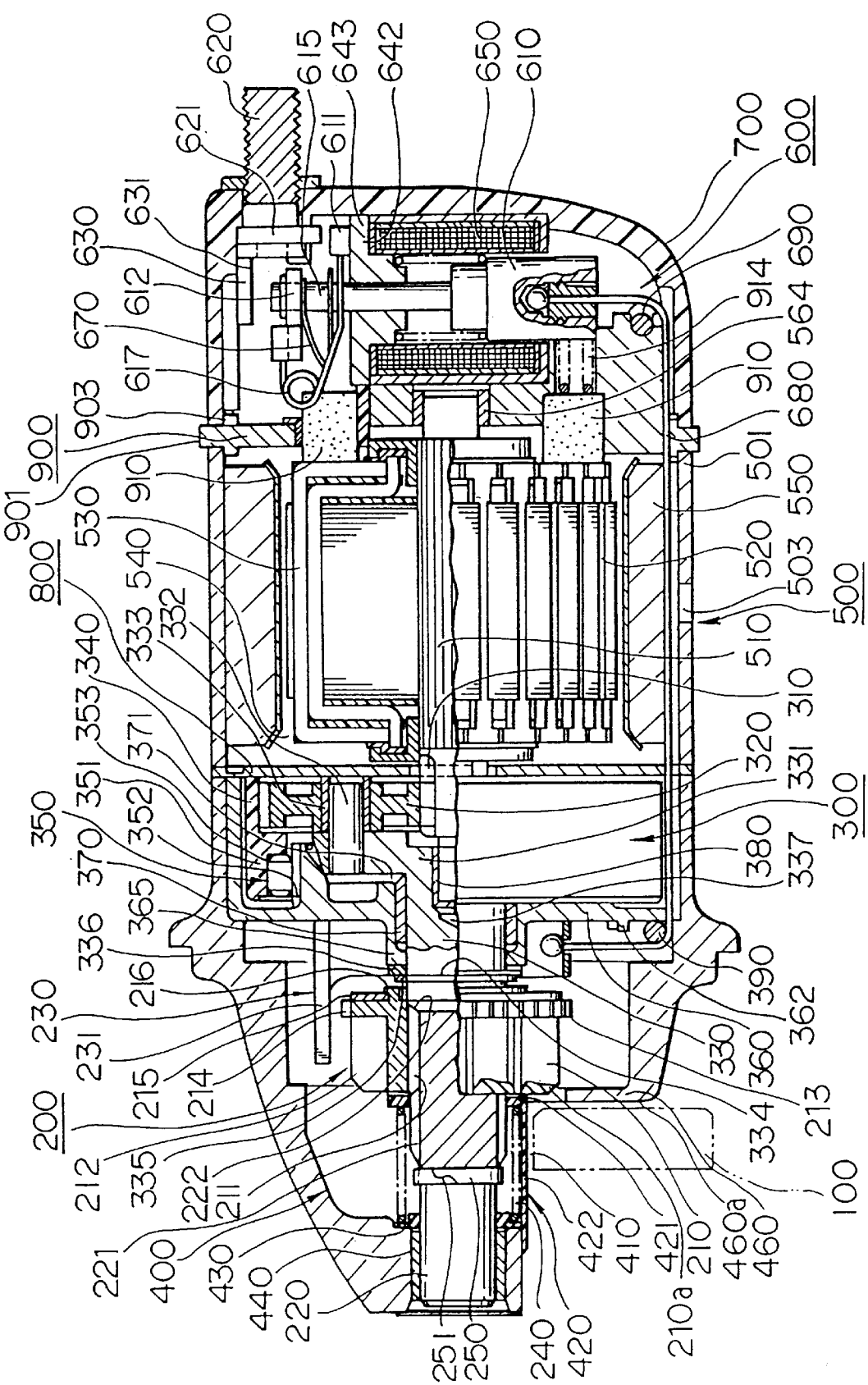
FIG. 1 is a sectional side view showing a starter according to a first embodiment of the present invention.

A starter according to the first embodiment of the present invention will be described below with reference to FIGS. 1 through 17A–17C.

The starter comprises a housing 400 accommodating a pinion 200 engaging a ring gear 100 of an engine, a planetary speed reduction gear 300, and other members; a motor 500; and a rear end frame 700 accommodating a magnet switch 600 and other members. A motor partitioning wall 800 is interposed between the space surrounded with the housing 400 and the space accommodating the motor 500. A brush holder 900 is interposed between the space accommodating the motor 500 and the space surrounded with the end frame 700.

(Pinion 200)

Figure 2A:
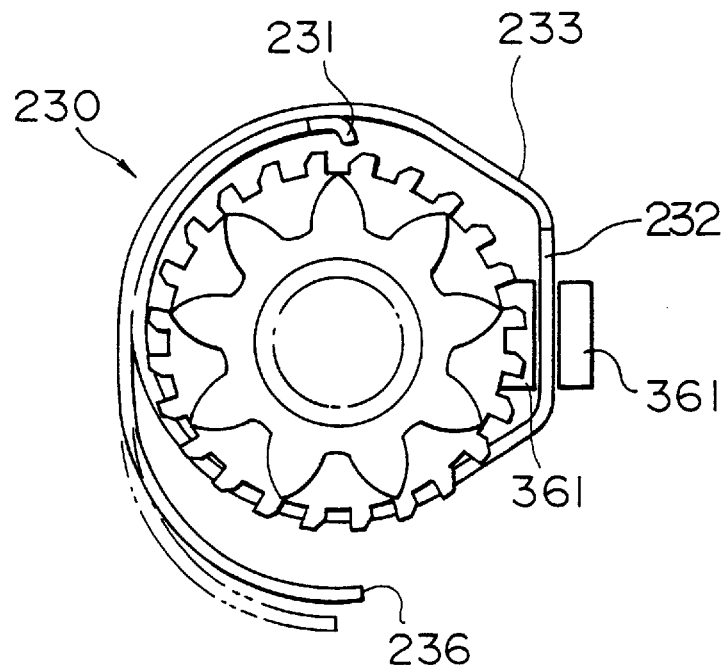
FIG. 2A is a front view showing a state in which a pinion rotation regulation member is installed on a pinion.
Figure 2B:
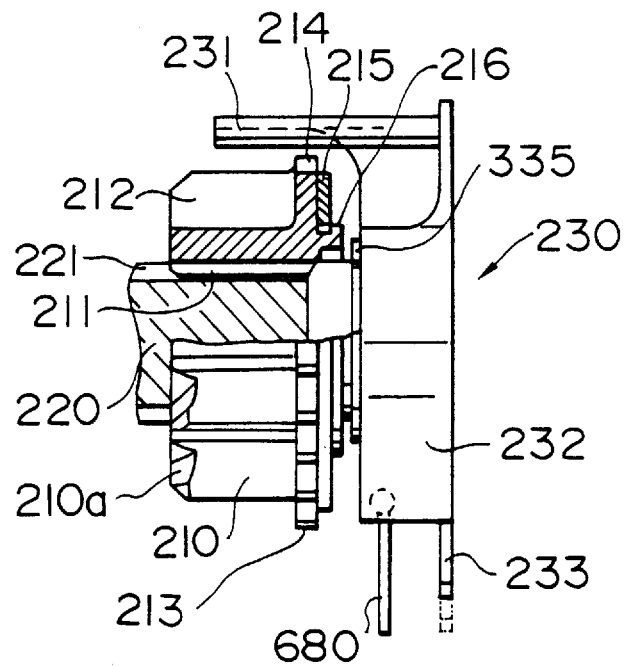
FIG. 2B is a side view partly in section showing a state in which the pinion rotation regulation member is installed on the pinion.

As shown in FIGS. 1 and 2A–2B, a pinion gear 210 engageable with the ring gear 100 of the engine is formed on the pinion 200. The pinion gear 210 has, on the inner peripheral face thereof, a pinion helical spline 211 mating with a helical spline 221 formed on an output shaft 220.

An annular flange 213 having a diameter greater than that of the pinion gear 210 is formed on the pinion gear 210 at the side opposite to the position of the ring gear side. The flange 213 has on the entire periphery thereof concaves/convexes 214 (teeth), the number of which is greater than that of external teeth of the pinion gear 210. The concaves/convexes 214 mate with a regulation claw 231 of a pinion rotation regulation member 230 which will be described later. An annular portion 216 formed at the rear end of the pinion gear 210 is bent toward the peripheral side thereof so that a washer 215 is rotatable at the rear of the flange 213 and prevented from slipping out of position in the axial direction of the pinion gear 210.

The pinion gear 210 is continually urged toward the rear of the output shaft 220 by a return spring 240 consisting of a compression coil spring. In this embodiment, the return spring 240 urges the pinion gear 210 not directly but through a ring member 421 of a shutter 420 which opens and closes an opening portion 410 of the housing 400. The shutter 420 will be described later.

(Pinion Rotation Regulation Member 230)

At one end of a rotation regulation portion 232, there is formed the regulation claw 231 extending in the axial direction of the pinion gear 210 and engageable with the concaves/convexes 214 formed on the flange 213 of the pinion gear 210. The regulation claw 231 constituting the pinion rotation regulation portion 232 engages the concaves/convexes 214 of the pinion gear 210 and is formed axially long to improve the rigidity thereof and bent radially inward so that the regulation claw 231 is L-shaped (bar-shaped) in section.

Referring to FIGS. 1 and 2A–2B, the operation of the pinion rotation regulation member 230 will be described below. A cord-shaped member 680 serves as a transmission means for transmitting the operation of the magnet switch 600 to the regulation claw 231. The operation of the magnet switch 600 causes the rotation regulation portion 232 to move downward. As a result, the regulation claw 231 engages the concaves/convexes 214 of the flange 213 of the pinion gear 210. At this time, the return spring 233 is flexed because one end 236 thereof is in contact with a position regulation shelf 362 projecting from a center bracket 360. When the output shaft 220 is rotated through the armature shaft 510 of the motor 500 and the planetary speed reduction gear 300, with the regulation claw 231 in engagement with the concaves/convexes 214 of the pinion gear 210, the pinion gear 210 moves forward along the helical spline 221 of the output shaft 220. When the forward movement of the pinion gear 210 is prevented due to the contact between the pinion gear 210 and the ring gear 100, the rotation of the output shaft 220 causes the pinion rotation regulation member 230 to be flexed. As a result, the pinion gear 210 rotates slightly, thus engaging the ring gear 100. With the forward movement of the pinion gear 210, the regulation claw 231 disengages from the concaves/convexes 214 and is placed rearward from the flange 213 of the pinion gear 210, and the front end of the regulation claw 231 contacts the rear surface of the washer 215, thus preventing the pinion gear 210 from moving backward against a retraction force being applied thereto by the ring gear 100.

(Pinion Stop Ring 250)

As shown in FIG. 1, a pinion stop ring 250 is fixed to an annular groove of rectangular cross section formed on the peripheral surface of the output shaft 220. Steel of rectangular cross section is processed to form the pinion stop ring 250. A substantially S-shaped concave/convex 251 serving as an engaging means is formed at each end of the pinion stop ring 250. A convex portion of one end of the pinion stop ring 250 engages a concave portion of the other end thereof, while the convex portion of the other end thereof engages the concave portion of one end thereof.

(Planetary Speed Reduction Gear 300)

As shown in FIG. 1, the planetary speed reduction gear 300 serves as a speed reduction means. That is, the planetary speed reduction gear 300 reduces the rotational speed of the motor 500 which will be described later to increase the output torque of the motor 500. The planetary speed reduction gear 300 comprises a sun gear 310 formed on the peripheral surface of the armature shaft 510 (described later), of the motor 500, at the front end thereof; a plurality of planetary gears 320 rotatable around the sun gear 310 in mesh therewith; a planet carrier 330 rotatably supporting the planetary gear 320 around the sun gear 310 and formed integrally with the output shaft 220; and a cylindrical internal gear 340 made of resin and engaging the planetary gear 320 at the inner periphery thereof.

(Overrunning Clutch 350)

An overrunning clutch 350 supports the internal gear 340 rotatably in only one direction (only the direction in which the internal gear 340 rotates under the rotation of the engine.) The overrunning clutch 350 has a clutch outer member 351 integral therewith and positioned at the front side of the internal gear 340 and constituting a first cylindrical portion; an annular clutch inner member 352 constituting a second cylindrical portion formed on the rear surface of a center bracket 360 constituting a stationary member of the starter, covering the front of the planetary speed reduction gear 300, and confronting the inner peripheral surface of the clutch outer member 351; and rollers 353 each accommodated in a roller accommodating portion (groove) formed on the inner peripheral surface of the clutch outer member 351, with each roller accommodating portion inclined with respect to the circumferential direction of the clutch outer member 351.

(Center Bracket 360)

The center bracket 360 is positioned inside the housing 400 at a rear portion thereof. The housing 400 and the center bracket 360 are connected with each other with a ring spring 390 having one end thereof secured to the housing 400 and the other end thereof secured to the center bracket 360. The ring spring 390 absorbs a rotational reaction applied to the clutch inner member 352 of the overrunning clutch 350, thus preventing the rotational reaction from being directly transmitted to the housing 400.

(Planet Carrier 330)

The planet carrier 330 has at its rear end a flange-shaped projection 331 extending radially to support the planetary gear 320. A pin 332 extending rearward is fixed to the flange-shaped projection 331, thus rotatably supporting the planetary gear 320 through a metal bearing 333.

The planet carrier 330 integral with the output shaft 220 is rotatably supported by a housing bearing 440, the front end of which is fixed to the front end of the housing 400 and a center bracket bearing 370 fixed to an inner cylindrical portion 365 formed on the inner periphery of the center bracket 360.

The planet carrier 330 has an annular groove 334 at the front end of the inner cylindrical portion 365. A stop ring 335 fits in the annular groove 334. A washer 336 rotatably mounted on the planet carrier 330 is provided between the stop ring 335 and the front end of the inner cylindrical portion 365. The contact between the stop ring 335 and the front end of the inner cylindrical portion 365 via the washer 336 prevents the rearward movement of the planet carrier 330. A flange portion 371 sandwiched between the rear end of the inner cylindrical portion 365 and the flange-shaped projection 331 of the planet carrier 330 is formed on the rear end of the center bracket bearing 370 supporting the rear side of the planet carrier 330. The forward movement of the planet carrier 330 is prevented by the contact between the flange-shaped projection 331 and the rear end of the inner cylindrical portion 365 through the flange portion 371.

A concave 337 extending in the axial direction of the planet carrier 330 is formed on the rear surface thereof. The front end of the armature shaft 510 is rotatably supported by means of a planet carrier bearing 380 positioned in the concave 337.

(Housing 400)

Figure 3:
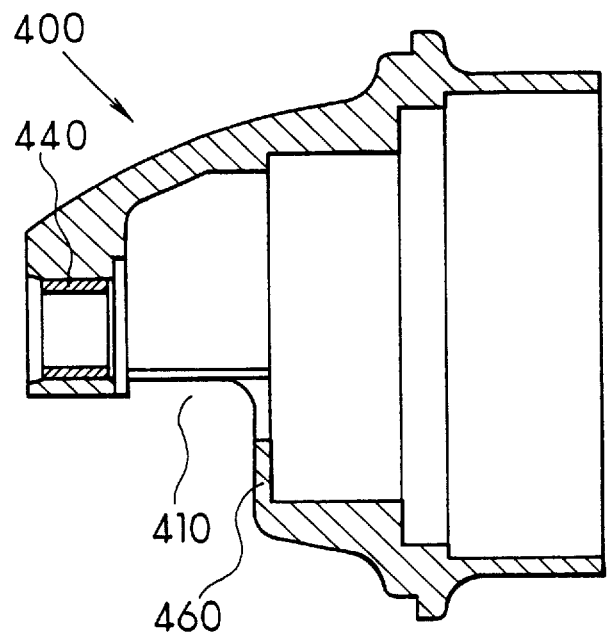
FIG. 3 is a side view partly in section showing a housing.
Figure 4:
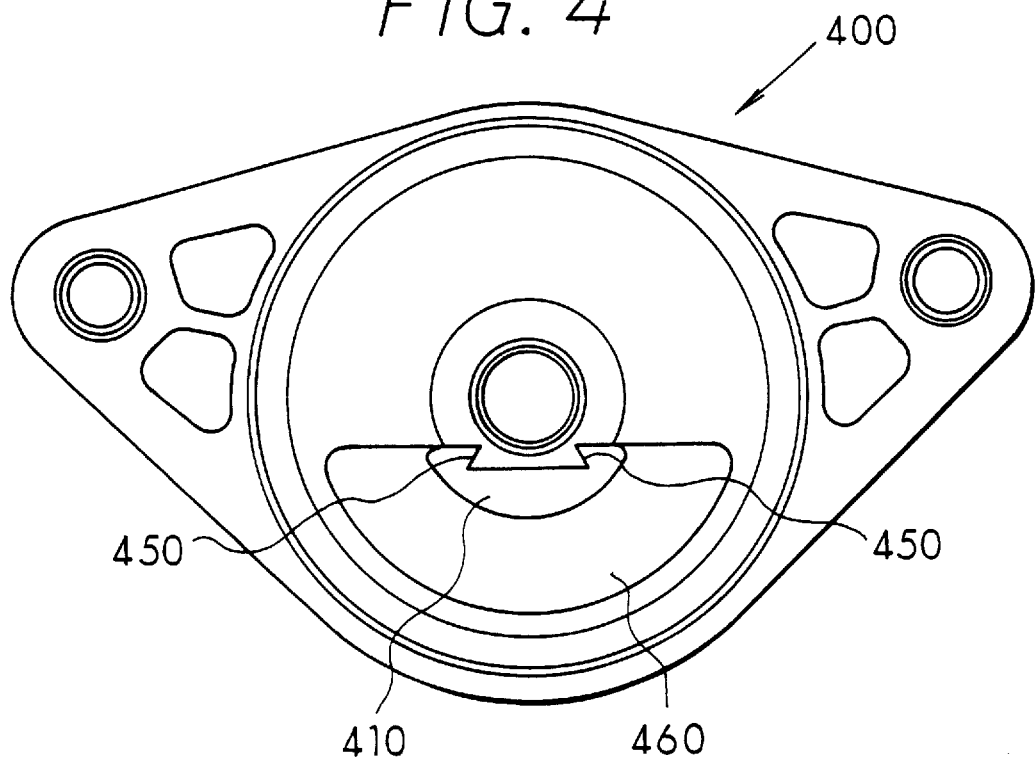
FIG. 4 is a front view showing the housing.

As shown in FIG. 1, a housing bearing 440 fixed to the front end of the housing 400 supports the output shaft 220. Referring further to FIGS. 3 and 4, in order to minimize the penetration of rainwater or the like into the housing 400 through the opening portion 410, the housing 400 accommodates a projected water barrier wall 460 positioned below the opening portion 410 to minimize the gap between the housing 400 and the periphery of the pinion gear 210. Referring to FIG. 4, the housing 400 also accommodates two slide grooves 450 positioned at a lower portion of the front end thereof and extending in the axial direction of the output shaft 220. The shutter 420 which will be described below is provided on the slide grooves 450.

(Shutter 420)

Figure 5:
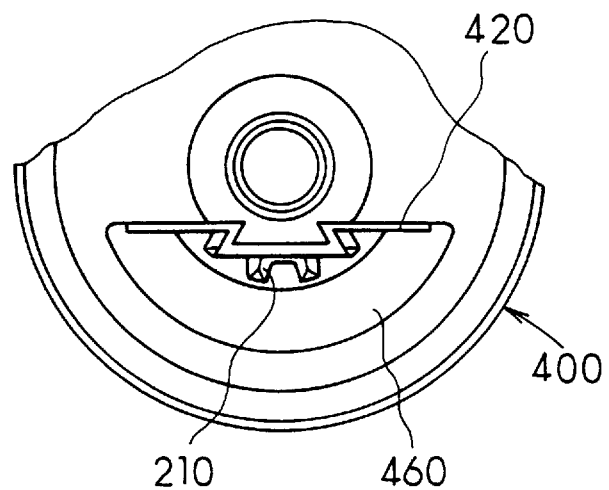
FIG. 5 is a front view showing a state in which a shutter is installed on the housing.
Figure 6:
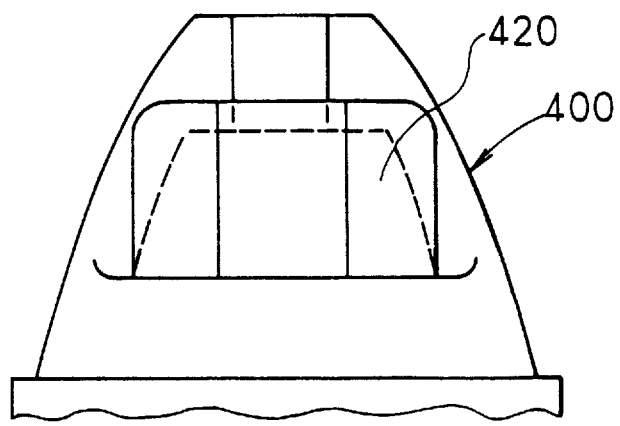
FIG. 6 is a side view showing a state in which the shutter is installed on the housing.
Figure 7:
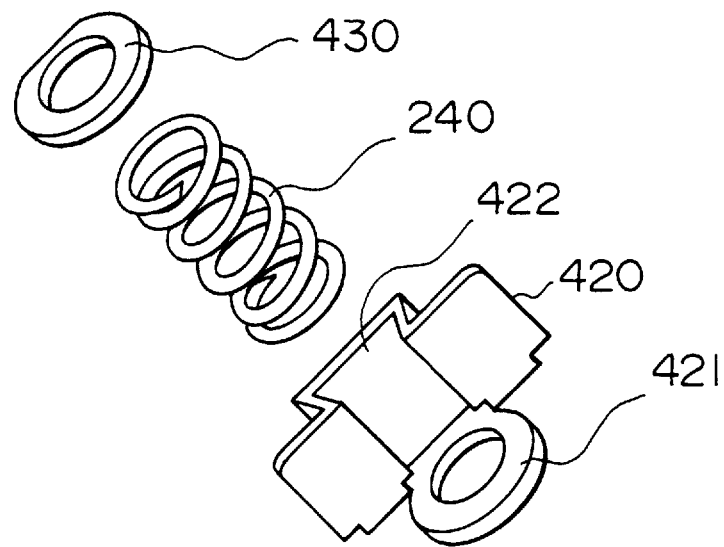
FIG. 7 is an exploded perspective view showing the shutter.

As understood from FIGS. 4 through 8, the shutter 420 made of a resinous material, for example, nylon comprises a ring member 421 installed on the periphery of the output shaft 220 and sandwiched between the return spring 240 and the pinion gear 210; and a water barrier portion 422 for opening and closing the opening portion 410 of the housing 400. As shown in FIG. 5, the water barrier portion 422 is curved so that it fits in the two slide grooves 450 positioned at a lower portion of the front end of the housing 400 and extending in the axial direction of the output shaft 220. This construction allows the water barrier portion 422 to move only axially in the housing 400, together with the ring member 421. A washer 480 is interposed between the shutter 420 and the pinion gear 210.

Figure 8:
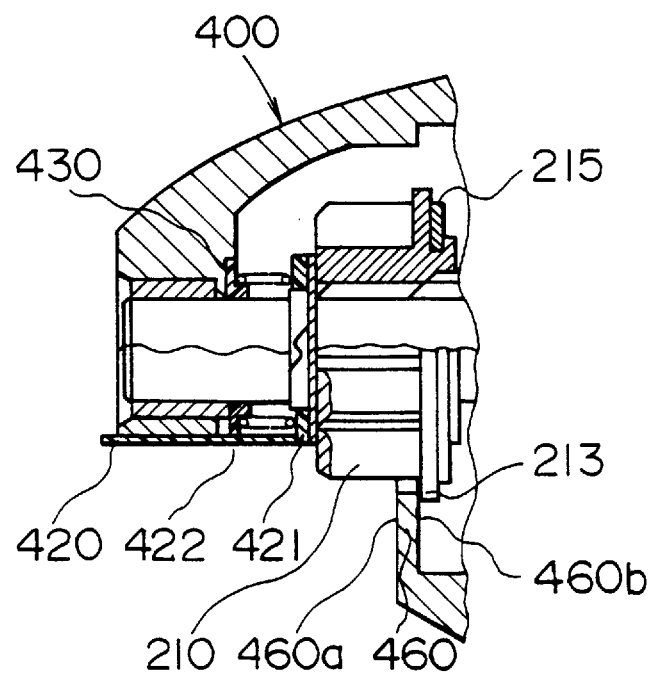
FIG. 8 is a sectional view showing main portions when the pinion is in operation.

The operation of the shutter 420 is described below. When the starter has started and the pinion gear 210 has moved forward along the output shaft 220, the ring member 421 moves forward together with the pinion gear 210. As a result, the water barrier portion 422 integral with the ring member 421 moves forward, thus opening the opening portion 410 of the housing 400 (FIG. 8.) When the starter has stopped and the pinion gear 210 has moved backward along the output shaft 220, the ring member 421 moves backward together with the pinion gear 210. Consequently, the water barrier portion 422 integral with the ring member 421 moves backward, thus closing the opening portion 410 of the housing 400. That is, when the starter is not in operation, the water barrier portion 422 of the shutter 420 for opening and closing the opening portion 410 of the housing 400 prevents rainwater or the like which has been splashed by the centrifugal force of the ring gear 100 from penetrating into the housing 400.

In the construction in which the return spring 240 urges the pinion gear 210 directly, the rotational force of the pinion gear 210 is transmitted to the return spring 240. Consequently, the return spring 240 expands. In order to solve this problem, heretofore, it is necessary to install a rotation regulation member, for example, a washer for preventing the transmission of the rotation of the pinion gear 210 to the return spring 240 between the pinion gear 210 and the return spring 240. In this embodiment, however, the ring member 421 of the shutter 420 is utilized to prevent the transmission of the rotation of the pinion gear 210 to the return spring 240. This construction eliminates the need for using the rotation regulation member. Thus, this construction allows the use of a smaller number of parts and facilitates the assembling operation of the starter.

A tapered portion 222 is formed at the rear of the output shaft 220. When the pinion helical spline 211 has contacted the tapered portion 222, the pinion gear 210 is prevented from moving rearward from the tapered portion 222. The pinion stop ring 250 is mounted at the front side of the output shaft 220, thus preventing the pinion gear 210 from moving forward from the pinion stop ring 250.

As shown in FIGS. 1 and 8, when the starter is not in operation (FIG. 1), the front end surface 210a of the pinion gear 210 does not project toward the ring gear side from the front end face 460a of the water barrier wall 460 of the housing 400. As shown in FIG. 8, when the starter has started, the flange 213 of the pinion gear 210 is not brought into contact with the rear end surface 460b of the water barrier wall 460, but the pinion gear 210 engages the ring gear 100. This construction prevents rainwater or the like which has been splashed by the centrifugal force of the ring gear 100 from directly penetrating into the housing 400.

Water which has penetrated into the housing 400 through the gap between the housing 400 and the pinion gear 210 is discharged to the outside of the housing 400 from an unshown water drain hole.

(Sealing Member 430)

Figure 9:
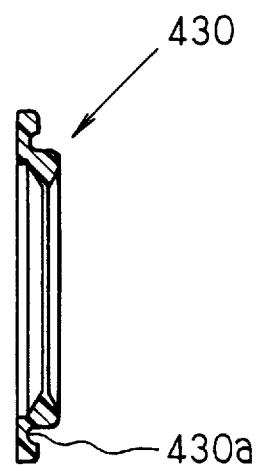
FIG. 9 is a sectional view showing a sealing member.
Figure 10:
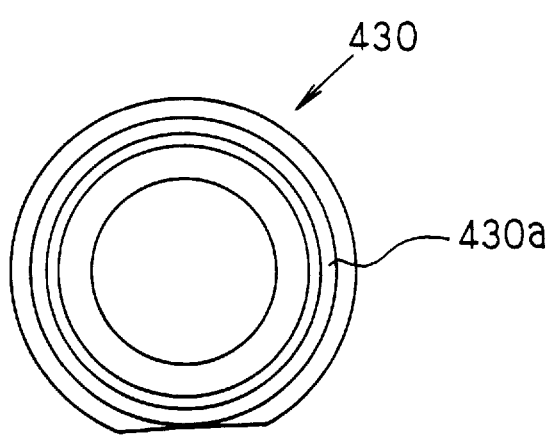
FIG. 10 is a front view showing the sealing member.

As shown in FIGS. 9 and 10, one end of the return spring 240 is secured to an annular groove 430a formed on the end surface of the sealing member 430. The sealing member 430 seals the periphery of the output shaft 220, thus preventing rainwater or dust which has penetrated into the housing 400 from the opening portion 410 from penetrating into the housing bearing 440 positioned at the front end of the housing 400.

(Motor 500)

The motor 500 is surrounded with a yoke 501, the motor-partitioning wall 800, and the brush holder 900 which will be described later. The motor-partitioning wall 800 accommodates the planetary speed reduction gear 300 between it and the center bracket 360 and serves as a means for preventing lubricating oil in the planetary speed reduction gear 300 from penetrating into the motor 500. The yoke 501 is formed with a hole 503 at the bottom thereof for discharging inside air toward outside during starter motor rotation.

Figure 11:
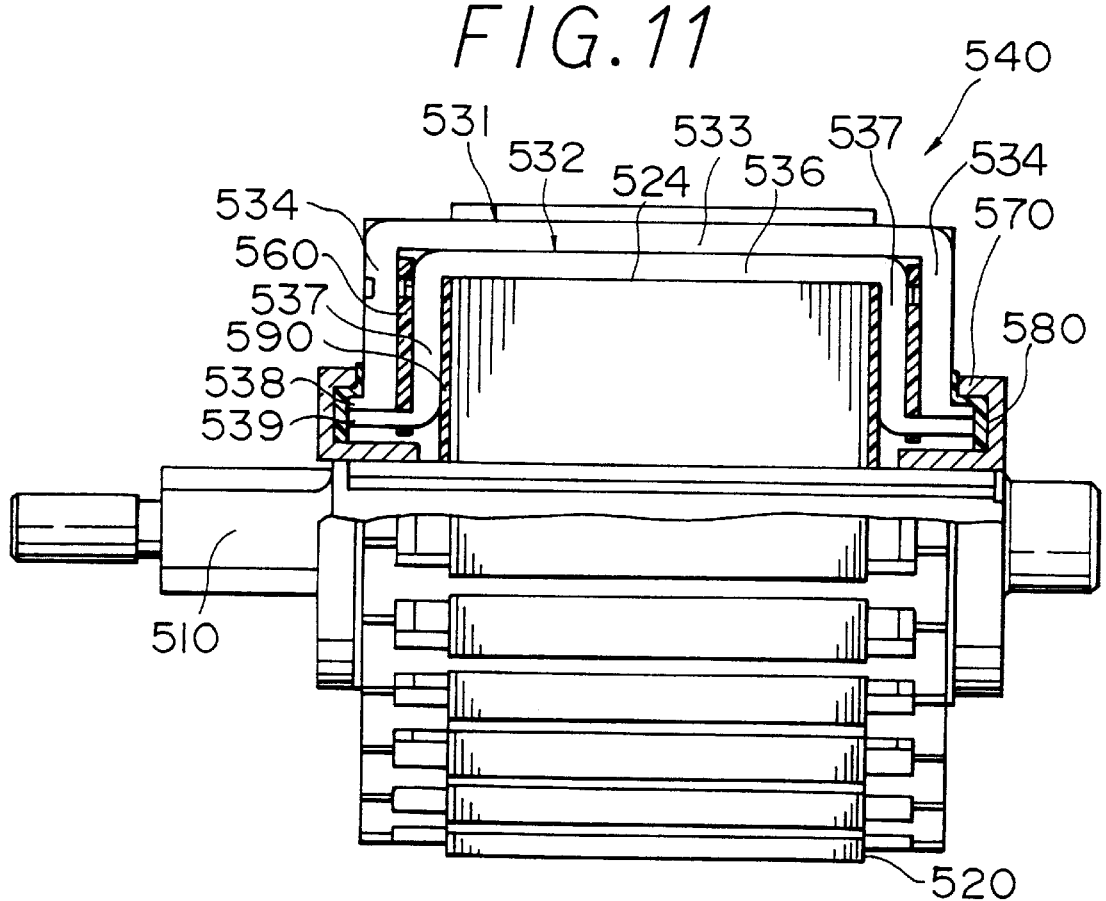
FIG. 11 is a side view partly in section showing an armature.

Referring to FIGS. 1 and 11, the motor 500 comprises an armature shaft 510; an armature 540 composed of an armature core 520 and an armature coil 530 and fixed to the armature shaft 510 for rotation therewith; and fixed magnetic poles 550, for rotating the armature 540, fixed to the inner periphery of the yoke 501.

(Armature Shaft 510)

The armature shaft 510 is rotatably supported by the planet carrier bearing 380 positioned in the concave 337 formed on the rear surface of the planet carrier 330 and by a brush holder bearing 564 fixed to the inner periphery of the brush holder 900. The front end of the armature shaft 510 is inserted into the planetary speed reduction gear 300. As described previously, the sun gear 310 of the planetary speed reduction gear 300 is formed on the peripheral surface of the armature shaft 510 at the front end thereof.

(Armature Coil 530)

Referring to FIG. 11, the armature coil 530 comprises a plurality of double-layer winding coils each consisting of an upper layer coil bar 531 and a lower layer coil bar 532 layered thereon in the radial direction of the armature shaft 510 and electrically connected with each other at the ends thereof to form a ring-shaped coil. The number of the upper layer coil bars 531 and that of the lower layer coil bars 532 are equally 25.

(Upper Layer Coil Bar 531)

The upper layer coil bar 531 made of a material, for example, copper high in electrical conductivity comprises an upper layer coil side 533 extending in parallel with the fixed magnetic pole 550 and held on the peripheral side of a slot 524 and two upper layer coil ends 534 bent radially inward from both ends of the upper layer coil side 533 and extending in the direction orthogonal to the axial direction of the armature shaft 510. The upper layer coil side 533 and the two upper layer coil ends 534 may be molded in integration with each other by cold forging, formed by bending a material into a U-configuration by press or by separately forming the upper layer coil side 533 and the two upper layer coil ends 534 and then joining them with each other by a joining method such as welding.

(Lower Layer Coil Bar 532)

Similarly to the upper layer coil bar 531, the lower coil bar 532 made of a material, for example, copper high in electrical conductivity has a lower layer coil side 536 extending in parallel with the fixed magnetic pole 550 and held on the inner peripheral side of the slot 524 and two lower layer coil ends 537 bent inward from both ends of the lower layer coil side 536 and extending in the direction orthogonal to the axial direction of the armature shaft 510. Similarly to the upper coil side 531, the lower layer coil side 536 and the two lower layer coil ends 537 may be molded in integration with each other by cold forging, formed by bending a material into U-configuration by press or by separately forming the lower layer coil side 536 and the two lower layer coil ends 537 and then joining them with each other by a joining method such as welding.

Each upper layer coil end 534 and the lower layer coil end 537 combined therewith are insulated from each other by means of an insulation spacer 560 made of a resinous material, while each lower layer coil end 537 and the armature core 520 are insulated from each other by an insulation ring 590 made of a resinous material, for example, nylon or phenol resin.

An upper layer inner extension portion 538 extending in the axial direction of the armature shaft 510 is formed at the inner peripheral end of each of the two upper layer coil ends 534. The inner peripheral surface of the upper layer inner extension portion 538 is layered on the peripheral surface of a lower layer inner extension portion 539, formed at the inner end of the lower layer coil bar 532, which will be described later and connected with each other electrically and mechanically by means of a joining method such as welding. Via an insulation cap 580, the peripheral surface of the upper layer inner extension portion 538 is brought into contact with the inner surface of a peripheral annular portion 571 of a fixing member 570 fixed into the armature shaft 510 under pressure.

In the armature 540, the upper layer coil ends 534 located at both ends of the upper layer coil bar 531 of the armature coil 530 and the lower layer coil ends 537 located at both ends of the lower layer coil bar 532 thereof are at right angles with the axial direction of the armature shaft 510.

Figure 12:
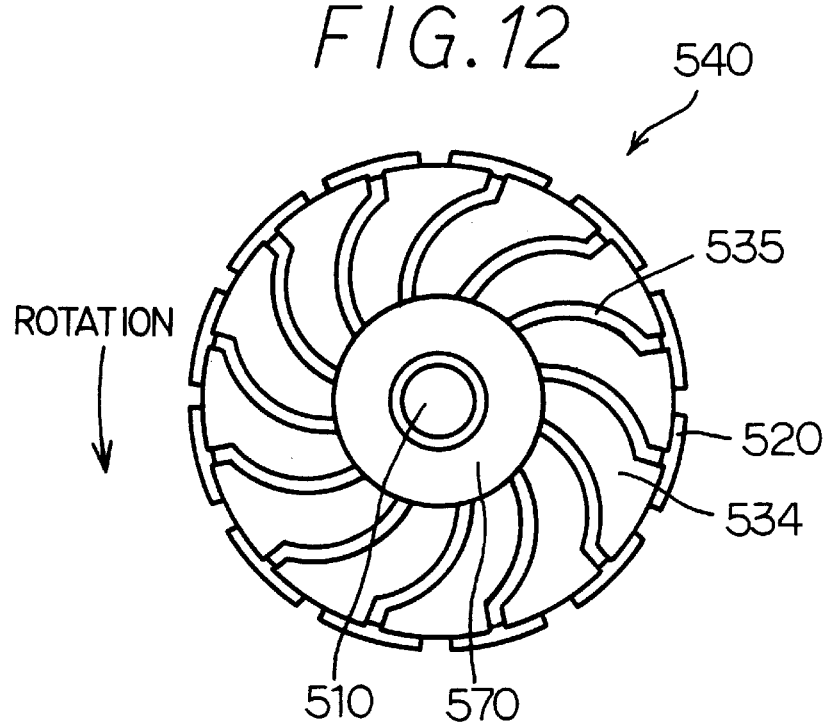
FIG. 12 is a front view showing the armature.

As shown in FIG. 12, each upper layer coil end 534 extend spirally in the radial direction of the armature 540 and the interval between the adjacent upper layer coil ends 534 in the circumferential direction of the armature 540 is almost constant from the inner periphery of the armature 540 to the periphery thereof. Thus, the area of contact between a brush 910 and the upper layer coil ends 534 is very large. This construction allows the heat of the brush 910 to be readily transmitted to the armature coil 530, thus keeping the brush 910 at a low temperature. FIG. 12 is depicted to clarify the configuration of the upper layer coil ends 534, and the number of the upper layer coil ends 534 is not necessarily equal to 25.

A groove 535 is formed between the adjacent upper layer coil ends 534 which contact the brush 910. As shown in FIG. 12, the groove 535 is formed spirally in the radial direction of the armature 540 such that peripheral side thereof is rearward from the inner peripheral side thereof in the rotational direction of the armature 540. This construction causes the brush 910 to contact the upper layer coil ends 534 in the order from its inner side which rotates slow to its outer side which rotates fast. Thus, the brush 910 which continuously slide-contacts at least one of the upper layer coil ends 534 without jumping from one coil end 534 to another adjacent one.

The groove 535 formed between the adjacent upper layer coil ends 534 serves as a means for cooling the sliding-contact surface of the brush 910 and those of the upper layer coil ends 534. When the armature 540 rotates, i.e., when the groove 535 rotates, centrifugal air is generated radially outwardly. The centrifugal air generated by the rotation of the groove 535 is utilized to cool heat generated by the sliding contact between the brush 910 and the upper layer coil ends 534 and discharge brush powders to the outside of the starter.

(Fixed Magnetic Pole 550)

The fixed magnetic pole 550 is fixed to the inner periphery of the yoke 501 by a fixing sleeve 553 positioned on the inner periphery of the fixed magnetic pole 550. In this embodiment, the fixed magnetic pole 550 consists of a permanent magnet, but coils which generate a magnetic force by electric current applied thereto may be used.

(Magnet Switch 600)

As shown in FIG. 1, the magnet switch 600 held by the brush holder 900 which will be described later is accommodated inside the rear end frame 700 which will be described later, in such a manner that the magnet switch 600 is approximately perpendicular to the armature shaft 510.

Energized with electric current, the magnet switch 600 drives the plunger 610 upward, thus bringing two contacts (lower movable contact 611 and upper movable contact 612) moving together with the plunger 610 into contact with a head 621 of a terminal bolt 620 and a fixed contact 630 sequentially. An unshown battery cable is connected with the terminal bolt 620.

Figure 13:
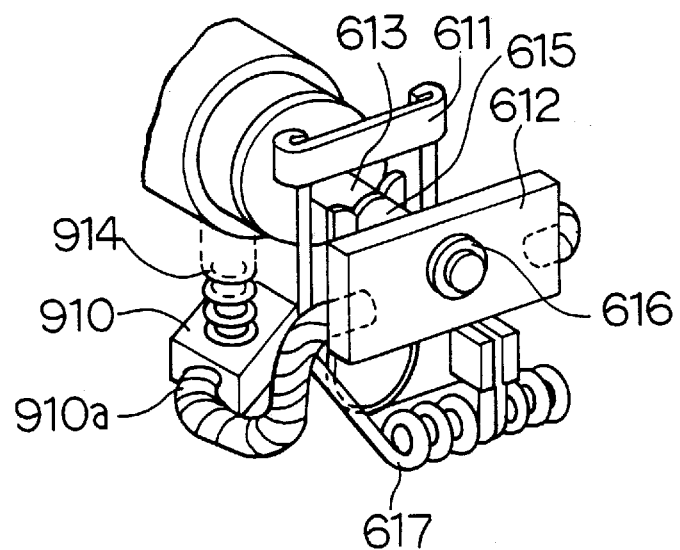
FIG. 13 is a perspective view showing a plunger of a magnet switch.

A plunger shaft 615 extending upward from the plunger 610 is fixed to the plunger 610 at the upper end thereof. The plunger 610 is adjustably fixed to the cord-shaped wire 680 at the bottom thereof. The plunger shaft 615 projects upward from a through-hole formed at the center of a stationary core 642. The upper movable contact 612 located upward from the stationary core 642 is mounted in the periphery of the plunger shaft 615 such that the upper movable contact 612 is vertically movable in sliding contact with the plunger shaft 615. As shown in FIGS. 1 and 13, a stop ring 616 installed at the upper end of the plunger shaft 615 prevents the upper movable contact 612 from moving upward from the upper end of the plunger shaft 615. Consequently, the upper movable contact 612 is vertically movable in sliding contact with the plunger shaft 615 between the stop ring 616 and the stationary core 642. The upper movable contact 612 is continuously urged upward by means of a contact pressure spring 670 consisting of a leaf spring mounted on the plunger shaft 615.

The upper movable contact 612 is made of metal high in electrical conductivity. When both ends of the upper movable contact 612 has moved to its upward position, they contact two contact portions 631 formed on the fixed contact 630. A lead wire 910a of each of a pair of brushes 910 is electrically and mechanically fixed to the upper movable contact 612 by means of fastening or welding. One end of each of a plurality of resistors 617 (two in the first embodiment) serving as a current limitation means is inserted into a groove of the upper movable contact 612 and electrically and mechanically fixed thereto.

As described above, the lead wire 910a of each brush 910 is electrically and mechanically fixed to the upper movable contact 612 by means of fastening or welding. The upper movable contact 612 may be integral with the lead wire 910a of each brush 910.

The resistor 617 composed of a high resistance metal wire winding serves a means for rotating the motor 500 at a low speed in an early period after the start of the starter. The lower movable contact 611 located below the head 621 of the terminal bolt 620 is fixed to the other end of the resistor 617.

The lower movable contact 611 made of metal, for example, copper high in electrical conductivity contacts the upper surface of the stationary core 642 when the operation of the magnet switch 600 has stopped and thus the plunger 610 is at its downward position. In the upward movement of the resistor 617 owing to the upward movement of the plunger shaft 615 caused by the upward movement of the plunger 610, the lower movable contact 611 contacts the head 621 of the terminal bolt 620 before the upper movable contact 612 contacts the contact portion 631 of the fixed contact 630.

(End Frame 700)

Figure 14:
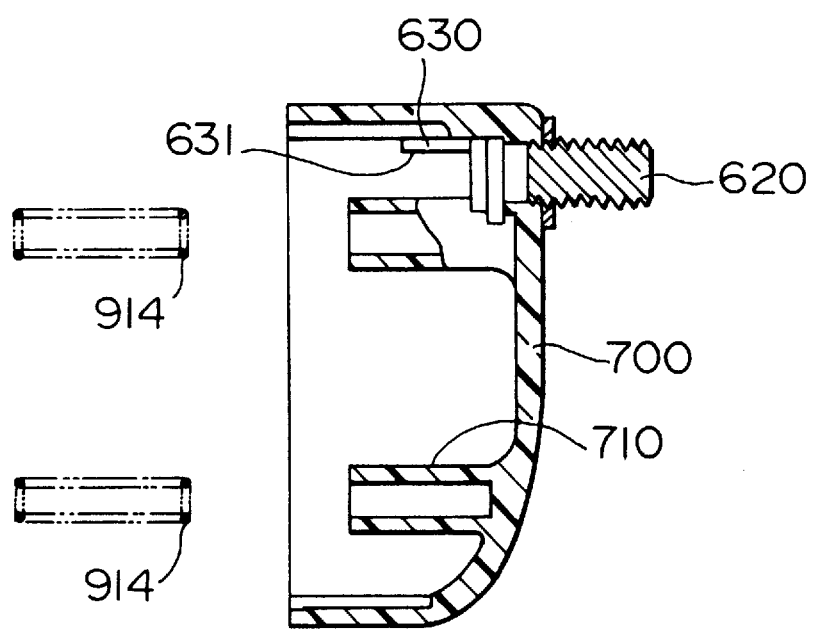
FIG. 14 is a sectional view showing an end frame and a brush spring.

As shown in FIG. 14, the end frame 700 is made of a resinous material, for example, phenol resin serving as a magnet switch cover for accommodating the magnet switch 600.

Spring holding pillars 710 holding a compression coil spring 914 urging the brushes 910 forward project from the rear surface of the end frame 700 in correspondence with the positions of the brushes 910.

(Brush Holder 900)

Figure 15:
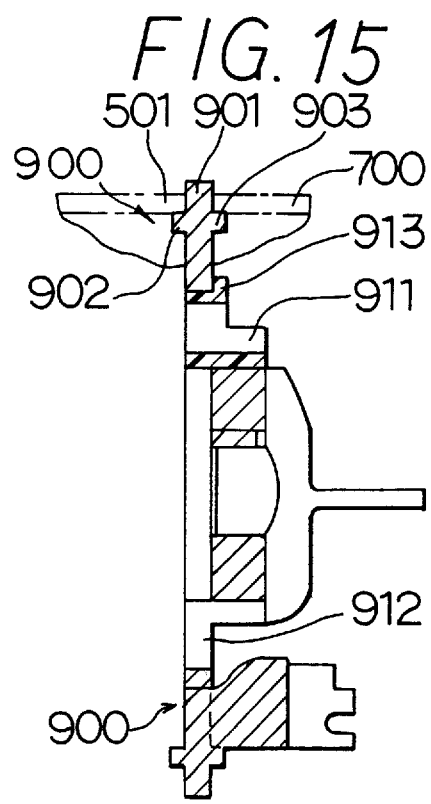
FIG. 15 is a longitudinal sectional view showing a brush holder.

Referring to FIGS. 1 and 15, the brush holder 900 is in a plate shape and fixedly held between the yoke 501 made of soft steel and the rear end frame 700 made of resin by means of engaging guides 902 and 903 projecting from the brush holder 900. That is, the brush holder 900 connects the yoke 501 and the end frame 700 with each other, thus supporting them. The periphery of the brush holder 900 projects outside from the peripheral surface of the yoke 501 and the end frame 700 in the radial direction thereof. That is, the brush holder 900 has a projection 901 which projects radially outside from the starter. The brush holder 900 is interposed between the space surrounded with the yoke 501 and the space surrounded with the end frame 700. The function of the brush holder 900 is to rotatably support the rear end of the armature shaft 510 through a brush holder bearing 564; hold the brush 910; hold the magnet switch 600; and hold a pulley 690 for guiding the cord-shaped member 680. An unshown hole through which the cord-shaped member 680 is inserted is formed on the brush holder 900.

Figure 16:
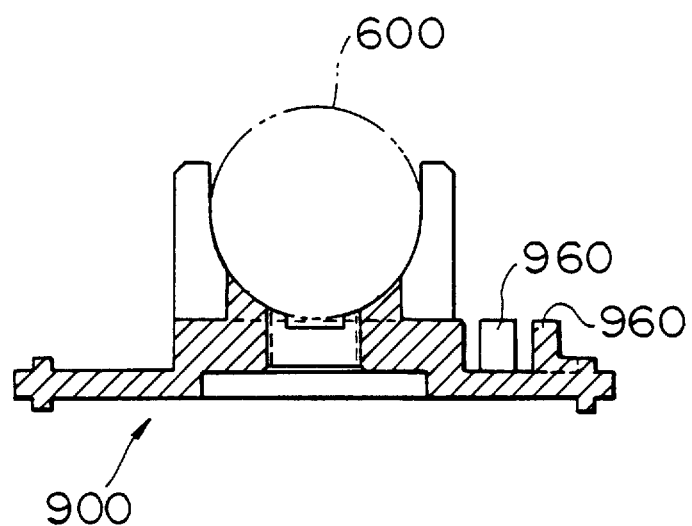
FIG. 16 is a transverse sectional view showing the brush holder.

The brush holder 900 and the engaging guides 902 and 903 projecting therefrom are integrally cast in metal such as aluminum into a wall which partitions the space in the starter as described above. Referring to FIGS. 15 and 16, the brush holder 900 has a plurality of brush-holding holes 911 and 912 for holding the brushes 910 in the axial direction thereof. In the first embodiment, the brush holder 900 has two upper brush-holding holes 911 and two lower brush-holding holes 912. The upper brush-holding holes 911 are adapted for holding therein the upper brush 910, which receives a positive voltage, via an insulation cylinder 913 made of resin, for example, nylon, phenol resin or the like. The lower brush-holding holes 912 are adapted for directly holding therein the lower brush 910 to be grounded. Further, the brush holder 900 is substantially parallel with the upper layer coil ends 534 of the armature 540 and proximate thereto.

Because the brush holder 900 formed as the partitioning wall of the starter serves as the means for holding the brush 910 thereon, it is not necessary to provide the starter with a brush holder separately. Therefore, the starter is allowed to have a smaller number of parts and a smaller number of assembling processes.

The compression coil spring 914 urges the front end surface of the brush 910 against the rear end surface of the upper layer coil ends 534 positioned at a rear portion of the armature coil 530.

(Operation of Starter)

The operation of the starter will be described below with reference to FIGS. 17A through 17C.

When a key switch 10 is set at the start position by a driver, an attraction coil 650 of the magnet switch 600 is energized with electric current supplied by a battery 20. As a result, the plunger 610 is attracted to a magnetic force generated by the attraction coil 650 and moves upward from its lower position.

Figure 17A:
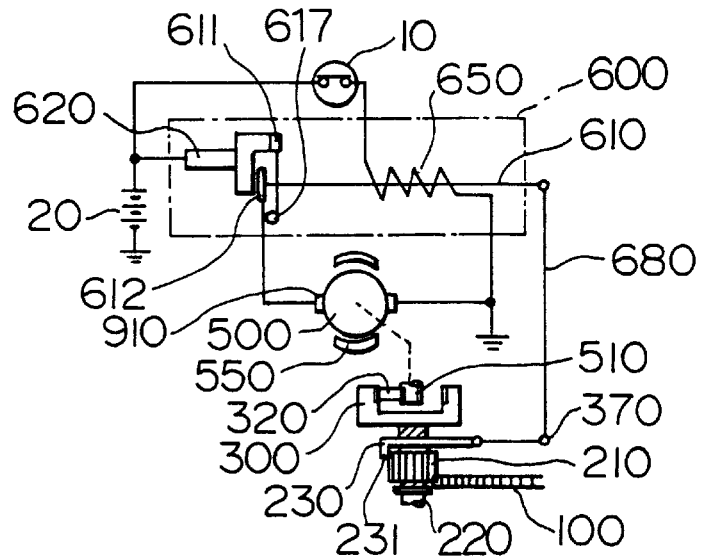
FIGS. 17A, 17B and 17C are electric circuit diagrams each showing the operation state of the pinion.

Referring to FIG. 17A, when the plunger 610 has started to move upward, the plunger shaft 615 moves upward. Consequently, the upper movable contact 612 and the lower movable contact 611 move upward and the rear end of the cord-shaped member 680 also moves upward. As a result, the front end of the cord-shaped member 680 moves downward and the pinion rotation regulation member 230 moves downward. Then, the regulation claw 231 engages the concaves/convexes 214 of the pinion gear 210. At this time, the lower movable contact 611 contacts the head 621 of the terminal bolt 620. The voltage of the terminal bolt 620 applied thereto by the battery 20 is transmitted to the upper brush 910 via the lower movable contact 611, the resistor 617, the upper movable contact 612, and the lead wire 910a. That is, a low voltage through the resistor 617 is transmitted to the armature coil 530 via the upper brush 910. The lower brush 910 is continuously grounded through the brush holder 900. Hence, the armature coil 530 composed of the upper layer coil bar 531 and the lower layer coil bar 532 combined with each other is energized at a low voltage. As a result, the armature coil 530 generates a relatively weak magnetic force which acts (attracts or repels) on the magnetic force of the fixed magnetic pole 550. As a result, the armature 540 rotates at a low speed.

As a result of the rotation of the armature shaft 510, the planetary gear 320 of the planetary speed reduction gear 300 is driven by the sun gear 310 thereof positioned at the front end of the armature shaft 510. When the planetary gear 320 transmits the rotational torque in the direction in which the ring gear 100 rotates to the internal gear 340 through the planet carrier 330, the rotation of the internal gear 340 is prevented by the operation of the overrunning clutch 350. That is, because the internal gear 340 is prevented from rotating, the planet carrier 330 is rotated at a reduced speed by the rotation of the planetary gear 320. Although the planet carrier 330 rotates, the pinion gear 210 does not rotate but moves forward along the helical spline 221 of the output shaft 220, because the pinion rotation regulation member 230 prevents the rotation of the pinion gear 210.

With the forward movement of the pinion gear 210, the shutter 420 moves forward, thus opening the opening portion 410 of the housing 400, and the pinion gear 210 engages the ring gear 100 of the engine completely and then, contacts the pinion stop ring 250. With the forward movement of the pinion gear 210, the regulation claw 231 disengages from the concaves/convexes 214 of the pinion gear 210. Then, the front end of the regulation claw 231 is placed rearward from the washer 215 positioned at the rear of the pinion gear 210.

With the forward movement of the pinion gear 210, the upper movable contact 612 contacts the contact portion 631 of the fixed contact 630. As a result, the battery voltage of the terminal bolt 620 is directly transmitted to the upper brush 910 via the upper movable contact 612 and the lead wire 910a. That is, a high electric current flows through the armature coil 530 comprising the upper layer coil bar 531 and the lower layer coil bar 532. As a result, the armature coil 530 generates a strong magnetic force, thus rotating the armature 540 at a high speed.

The rotational speed of the armature shaft 510 is reduced by the planetary speed reduction gear 300 and thus its rotational torque increases. Thus, the armature shaft 510 drives the planet carrier 330. At this time, the pinion gear 210 rotates together with the planet carrier 330, with the front end of the pinion gear 210 in contact with the pinion stop ring 250. Because the pinion gear 210 is in mesh with the ring gear 100, the pinion gear 210 drives the ring gear 100. As a result, the output shaft of the engine is driven.

Figure 17B:
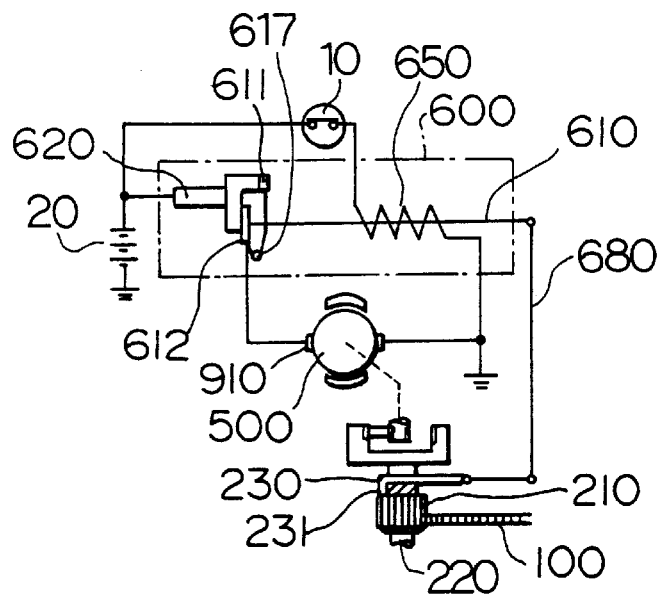

Referring to FIG. 17B, when the engine has started and the ring gear 100 of the engine rotates faster than the pinion gear 210, a force for moving the pinion gear 210 backward is applied thereto by the operation of the helical spline 221. However, the regulation claw 231 which is located at the rear of the pinion gear 210 prevents the backward movement of the pinion gear 210, and thus the pinion gear 210 is prevented from disengaging from the ring gear 100 in a short period of time. Thus the engine can be started reliably.

At this time, the upper layer coil ends 534 functioning as a surface-type commutator acts as a centrifugal fan, thus generating centrifugal air. Thus, the temperature of the sliding-contact portion of the upper layer coil ends 534 and that of the brush 910 can be kept at a low temperature.

When the ring gear 100 rotates faster than the pinion gear 210 as a result of the start of the engine, the pinion gear 210 is driven by the rotation of the ring gear 100. As a result, the rotational torque transmitted to the pinion gear 210 from the ring gear 100 is transmitted to the pin 332 supporting the planetary gear 320 through the planet carrier 330. That is, the planetary gear 320 is driven by the planet carrier 330. Then, a torque reverse to that at the start time of the engine is applied to the internal gear 340. Thus, the overrunning clutch 350 permits the rotation of the ring gear 100. That is, when the torque reverse to that at the start time of the engine is applied to the internal gear 340, the rollers 353 of the overrunning clutch 350 disengage from the concaves 355 of the clutch inner member 352. Thus the internal gear 340 can be rotated.

That is, the torque applied to the pinion gear 210 from the ring gear 100 of the engine at the start time thereof is absorbed by the overrunning clutch 350. Thus, the armature 540 is not driven by the engine.

When the engine has started, the driver releases the key switch 10 from the start position. As a result, the attraction coil 650 of the magnet switch 600 is deenergized. Then, the plunger 610 is moved to its downward position by the action of the compression coil spring 660.

Then, the upper movable contact 612 moves away from the contact portion 631 of the fixed contact 630 and then, the lower movable contact 611 moves away from the head 621 of the terminal bolt 620. Consequently, the upper brush 910 is deenergized.

Figure 17C:
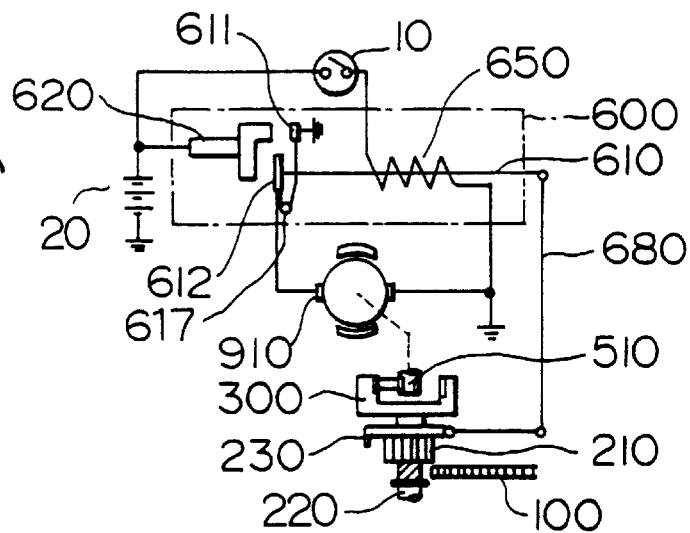

Referring to FIG. 17C, when the plunger 610 has been moved to its downward position, the return spring 233 of the pinion rotation regulation member 230 moves the pinion rotation regulation member 230 to the upward position and the regulation claw 231 disengages from the rear of the pinion gear 210. As a result, the return spring 240 moves the pinion gear 210 backward, thus disengaging the pinion gear 210 from the ring gear 100 of the engine and bringing the rear end of the pinion gear 210 into contact with the tapered portion 222 of the output shaft 220. That is, the pinion gear 210 is returned to the predetermined position at which the pinion gear 210 is positioned when the starter is not in operation.

When the plunger 610 has been moved to the downward position, the lower movable contact 611 contacts the upper surface of the stationary core 642 of the magnet switch 600. As a result, the lead wire of the upper brush 910 conduct electricity to the upper movable contact 612, the resistor 617, the lower movable contact 611, the stationary core 642, the magnet switch cover 640, and the brush holder 900. That is, the upper brush 910 and the lower brush 910 short through the brush holder 900, and an electromotive force is generated in the armature coil 530 due to the inertial rotation of the armature 540. Because the electromotive force shorts through the upper brush 910, the brush holder 900, and the lower brush 910, a braking force is applied to the inertial rotation of the armature 540. As a result, the armature 540 stops rapidly.

Other aspects of the first embodiment will be described below in detail.

As described above, referring to FIG. 15, the brush holder 900 is formed by aluminum die casting and fixedly interposed between the yoke 501 and the end frame 700, thus supporting them. The brush holder 900 has the cylindrical engaging guides 902 and 903 projecting therefrom axially. The engaging guides 902 and 903 are inserted through openings of the yoke 501 and those of the end frame 700. The peripheral surface of the engaging guides 902 and 903 are in contact with that of the yoke 501 and that of the end frame 700. This construction eliminates the need for machining both ends of the yoke 501 and those of the end frame 700 for connecting them with each other by means of spigot joint. Further, the brush holder 900 can be brought into contact with both end surfaces of the yoke 501 and those of the end frame 700 and the inner peripheral surface adjacent to both end surfaces. Accordingly, the brush holder 900 has an improved cooling performance; pressure is applied to the yoke 501 and the end frame 700 in a smaller degree; and the yoke 501 and the end frame 700 can be prevented from becoming loose in a great degree. In particular, because the end frame 700 is allowed to have a large pressure-receiving area, it is not necessary to thicken peripheral portion of the end frame 700 made of a resinous material.

As described previously, the brush holder 900 is substantially parallel with the upper layer coil ends 534 of the armature 540 and proximate thereto. Further, as shown in FIG. 15, the peripheral portion of the brush holder 900 is formed as a projected peripheral portion 901 which projects outside from the yoke 501, namely, the starter. This construction allows the heat of the brush 910 and that of the upper layer coil ends 534 in contact with the brush 910 to be reliably dissipated to the outside through the brush holder 900, thus preventing the thermal degradation of the brush 910 and the deterioration of the insulation performance of insulation varnish of the upper layer coil ends 534. Furthermore, the engaging guides 902 and 903 of the brush holder 900 facilitate operation of aligning (centering) various parts with each other in the radial direction thereof. In addition, the heat of the brush 910 and that of the upper layer coil ends 534 can be reliably dissipated by centrifugal air generated by the groove 535 formed between the adjacent upper layer coil ends 534.

(Modification)

Modifications of the brush holder 900 will be described below with reference to FIGS. 18A–18B through 24.

A projected peripheral portion 901a of a brush holder 900 shown in FIG. 18 is made sufficiently longer in the centrifugal direction than the projected peripheral portion 901 of the brush holder 900 of the first embodiment shown in FIG. 15. Slots 905 and/or grooves 906 are formed on the projected peripheral portion 901a in the axial direction thereof to flow cooling air therethrough. This construction allows the brush holder 900 to have an improved cooling performance.

In the brush holder 900 shown in FIG. 19, the width of the entire portion of the brush holder 900 positioned at the inner side with respect to the inner peripheral surface of the yoke 501 and the end frame 700 is increased to be equal to that of the engaging guides 902 and 903 shown in FIG. 15. The brush holder 900 is as advantageous as the brush holder 900 of the first embodiment. It is to be noted that reference numerals 902b and 903b denote the peripheral surface of the brush holder 900 in contact with the inner peripheral surface of the yoke 501 and that of the end frame 700, respectively.

Engaging guides 902c and 903c of a brush holder 900c shown in FIG. 20 are positioned on the peripheral surface of the yoke 501 and that of the end frame 700, respectively, unlike the brush holder 900 shown in FIG. 15. Thus, the inner peripheral surface of the engaging guide 902c and that of the engaging guide 903c are in contact with the outer peripheral surface of the yoke 501 and that of the end frame 700. The engaging guides 902c and 903c having this configuration are capable of dissipating the heat of the brush 910 and that of the upper layer coil ends 534 to the outside. The engaging guides 902c and 903c enable the brush holder 900 to have an improved cooling performance.

Figure 21A:
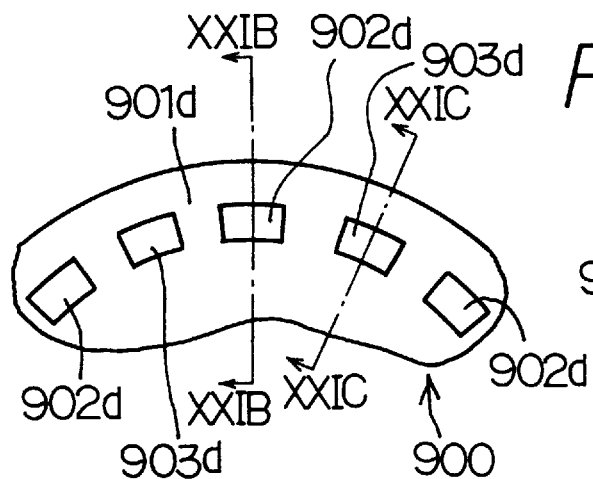
FIG. 21A is a partial front view showing an engaging guide formed on the brush holder in an axial direction thereof.
Figures 21B, 21C:
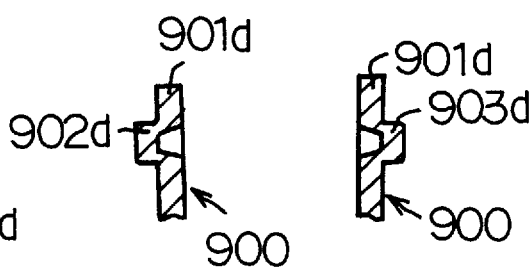
FIG. 21B is a sectional view taken along a line 21B—21B of FIG. 21A.
FIG. 21C is a sectional view taken along a line 21C—21C of FIG. 21A.

Engaging guides 902d and 903d of a brush holder 900 shown in FIGS. 21A–21C are formed in the axial direction of the plate-shaped brush holder 900 alternately in the circumferential direction by emboss, unlike the brush holder 900 shown in FIG. 15. This way of forming the engaging guides 902d and 903d permits the brush holder 900 to be manufactured by sheet metal working, thus omitting casting. It is to be noted that reference numeral 901d shown in FIG. 21 denotes a projected peripheral portion.

Figure 22A:
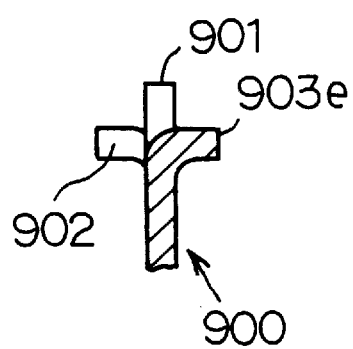
FIG. 22A is a side view partly in section showing a modification of a brush holder of the starter of the first embodiment.
Figure 22B:
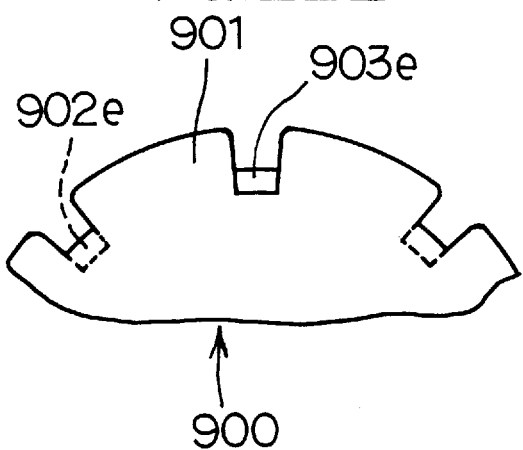
FIG. 22B is a partial front view showing an engaging guide formed on the brush holder in an axial direction thereof.

Engaging guides 902e and 903e of a plate-shaped brush holder 900 shown in FIGS. 22A–22B are formed by bending an outermost projecting portion 901 of the brush holder 900 in the axial direction, unlike the brush holder 900 shown in FIG. 15. This way of forming the engaging guides 902e and 903e allows the brush holder 900 to be manufactured by sheet metal working, thus omitting casting.

Figure 23A:
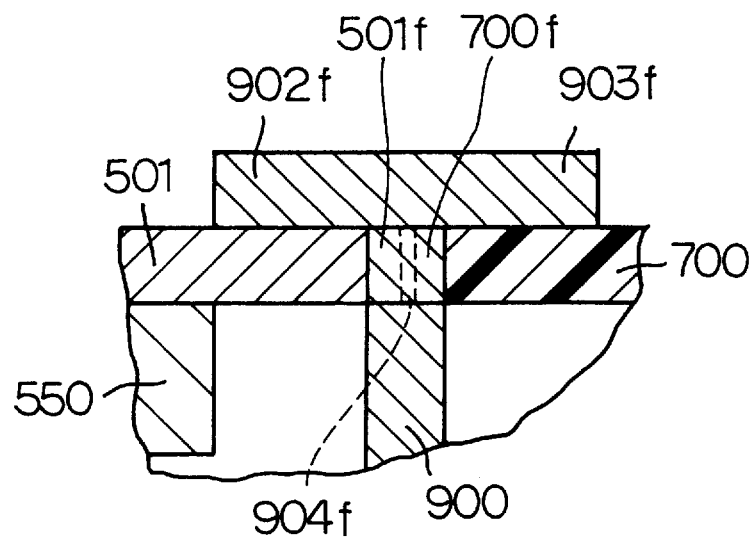
FIG. 23A is a side view partly in section showing a modification of a brush holder of the starter of the first embodiment.
Figure 23B:
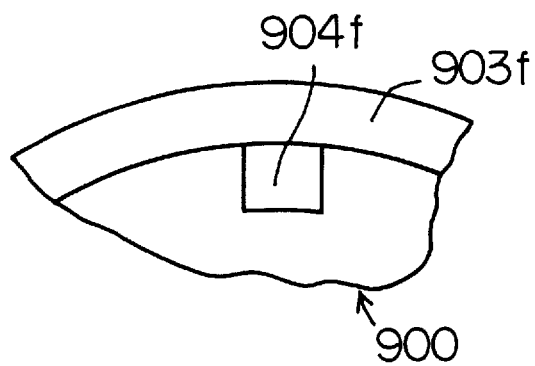
FIG. 23B is a partial front view showing a positioning portion formed on the brush holder in an axial direction thereof.

Referring to FIGS. 23A–23B, the brush holder 900 shown in FIG. 20 is modified. That is, a positioning hole 904f is formed on the brush holder 900 shown in FIG. 20. A positioning projection 501f projecting axially from an opening of the yoke 501 and a positioning projection 700f projecting axially from the end frame 700 are inserted into the positioning hole 904f. Engaging guides 902f and 903f are positioned radially outside the yoke 501 and the end frame 700. The positioning hole 904f allows the brush holder 900 to be easily positioned in the circumferential direction thereof.

Figure 24:
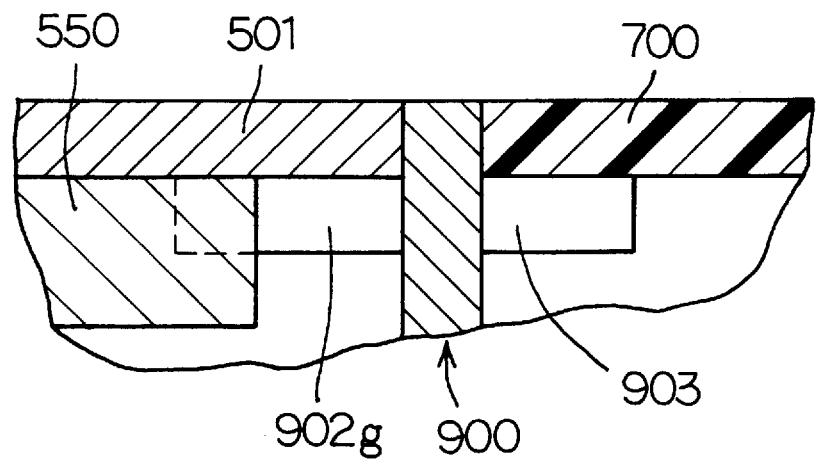
FIG. 24 is a side view partly in section showing a modification of a brush holder of the starter of the first embodiment.

In a brush holder 900 shown in FIG. 24, the engaging guide 902 shown in FIG. 15 is modified to a partially cylindrical engaging guide 902g having a predetermined width in the circumferential direction of the brush holder 900. The engaging guide 902g is inserted into the gap between adjacent permanent magnets 550 and 550. The engaging guide 902g facilitates the positioning of the brush holder 900 in the radial and circumferential direction thereof.

(Second Embodiment)

Figure 25:
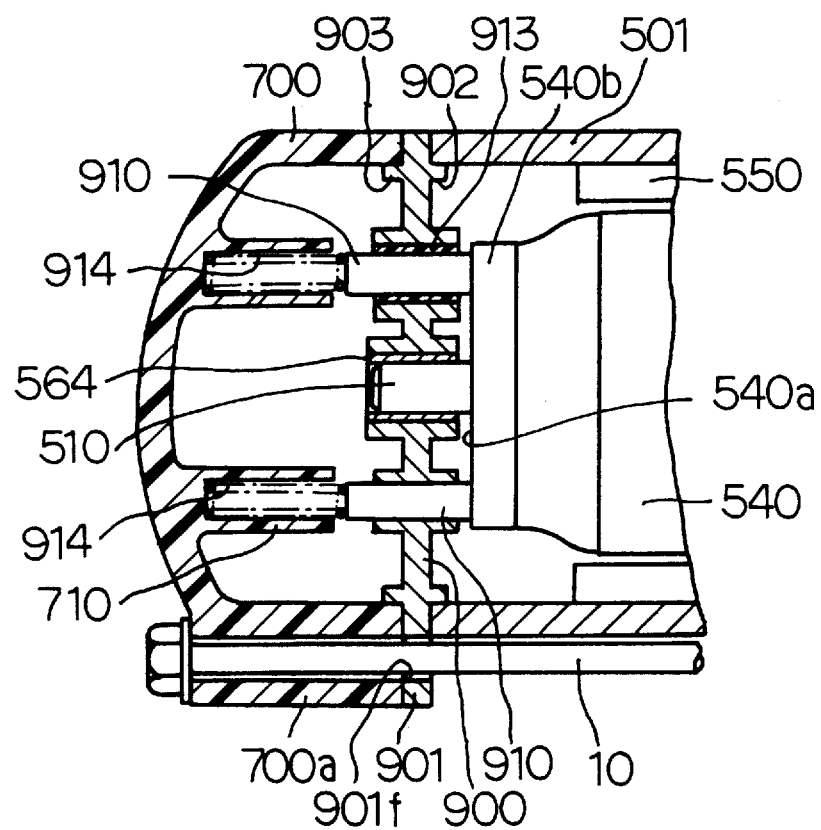
FIG. 25 is a sectional side view showing a starter according to a second embodiment.

A starter according to the second embodiment of the present invention will be described below with reference to FIG. 25.

A boss portion 700a through which a through bolt 10 is inserted is formed integrally with an end frame 700 made of resin. A brush holder 900 made of metal comprises brush-holding holes for holding therein brushes 910 and a bearing-holding hole for holding a bearing 564 which rotatably supports a shaft 510 of an armature 540. The negative-side brush (lowerside brush) 910 is urged to the right-hand side in the axial direction of the armature 540 by a spring 914 provided inside a spring-holding cylindrical portion 710 axially projecting from the inner end surface of the end frame 700, thus being pressed against an end surface 540a of a surface type commutator 540b of the armature 540. Similarly to the negative-side brush 910, the positive-side brush (upperside brush) 910 is urged by the spring 914 and pressed against the end surface 540a of the commutator 540b. The positive-side brush 910 is insulated from the brush holder 900 by an insulation member 913.

Similarly to the first embodiment, cylindrical projections 902 and 903 are axially formed on the peripheral surface of the brush holder 900. The end frame 700 and the yoke 501 are fastened to each other by means of the through bolt 10, with the brush holder 900 held between the yoke 501 and the end frame 700. A projecting portion 901 in contact with the boss portion 700a projects from the peripheral surface of the brush holder 900. The projecting portion 901 has a through hole 901f through which the through bolt 10 is inserted.

Figure 26:
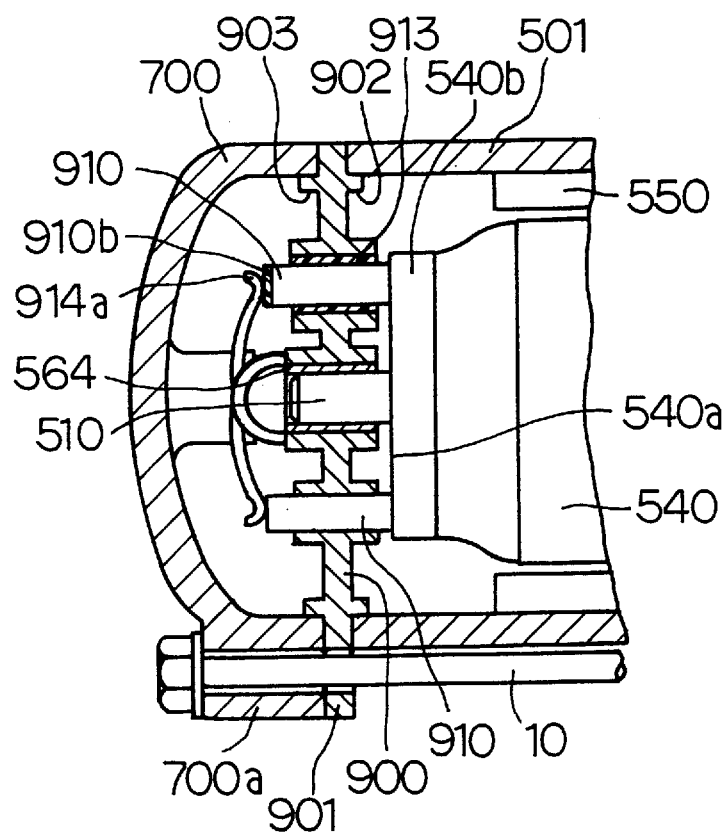
FIG. 26 is a side view partly in section showing a modification of the starter of the second embodiment.

As shown in FIG. 26, the bearing-holding portion of the shaft 510 of the armature 540 and the brush holder 900 may be separately formed from each other. The end frame 700 may be made of metal. A spring 914a has a configuration different from that of the spring 914 shown in FIG. 25. It is to be noted that the spring 914a biases both the positive and the negative brushes 910 toward the surface 540a. An insulation sheet 910b is provided on the positive brush (upperside brush) 910 to prevent short-circuiting between the positive and negative brushes 910 through the spring 914a.

According to the second embodiment, the brush holder 900 has the through hole 901f through which the through bolt 10 is inserted. Therefore, even when the through bolt 10 is loosened, the brush holder 900 can be prevented from slipping out of position radially so long as the through bolt 10 is not removed from the starter. Thus, the end frame 700 and the yoke 501 can be joined with each other firmly by means of the through bolt 10.

The present invention having been described above should not be limited to the disclosed embodiments and modifications but may be modified further without departing from the spirit of the invention.

What is claimed is:

1. A starter for driving a ring gear of an internal combustion engine, the starter comprising:

a starter motor;

a pinion rotatable with the starter motor and engageable with the ring gear; and a speed reduction mechanism for transmitting a rotation of the starter motor to the pinion in a reduced rotational speed, wherein the starter motor includes, a yoke which is cylindrical, made of metal, and has an opening at one axial end thereof;

an armature provided in a space surrounded by the yoke and having a surface type commutator positioned adjacent the axial opening of the yoke;

an end frame closing the opening of the yoke;

a brush contacting the surface type commutator in an axial direction of the surface type commutator;

a brush-accommodating cylindrical portion which is cylindrical, holds the brush, and is made of metal;

a brush holder which is substantially disc-shaped, made of metal, supports the brush-accommodating cylindrical portion, and is held between the yoke and the end frame;

the brush holder is disposed substantially in parallel with a brush-contact surface of the surface type commutator and proximate thereto; and the brush holder has a projected peripheral portion formed at a peripheral portion thereof such that the projected peripheral portion projects radially outside from the yoke and the end frame.

2. The starter according to claim 1, wherein:

the projected peripheral portion of the brush holder projects outside from a peripheral surface of the yoke and that of the end frame in a radial direction thereof.

3. The starter according to claim 2, wherein:

the projected peripheral portion of the brush holder has a hole penetrating through the brush holder in an axial direction thereof.

4. The starter according to claim 1, wherein the brush holder has a guide portion projecting at a peripheral side thereof in the axial direction thereof and engaged with at least one of inner and outer peripheral surfaces of the yoke and the end frame.

5. The starter according to claim 1, wherein:

the surface type commutator of the armature has radially extending grooves on the surface thereof for generating centrifugal air flow.

6. The starter according to claim 1, wherein:

the brush holder has, at an inner peripheral side thereof, a bearing portion for holding a bearing which supports a rotation shaft of the armature.

7. The starter according to claim 1, wherein:

the brush holder has a positioning portion which engages a positioning portion formed on each of the yoke and the end frame at a predetermined position in a circumferential direction thereof, thus determining a position of the brush holder in the circumferential direction thereof.

8. The starter according to claim 1, wherein:

the brush holder has, at the projected peripheral portion thereof, a through hole through which a through bolt for fastening the end frame and the yoke to each other is inserted.

9. The starter according to claim 1, wherein:

the brush holder is made of cast metal or bent metal blank-out plate.

* * * * *